(12) United States Patent

Yu et al.

(10) Patent No.: US 12,646,005 B2

(45) Date of Patent: Jun. 2, 2026

(54) OPTIMIZED PREDICTION OF TREE ENSEMBLE

(71) Applicant: International Business Machines Corporation, Armonk, NY (US)

(72) Inventors: Dong Hai Yu, Xi'An (CN); Jing Xu, Xi'An (CN); Jun Wang, Xi'An (CN); Xing Wei, Xi'An (CN); Lei Tian, Xi'An (CN); Yao Dong Liu, Xi'An (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1246 days.

(21) Appl. No.: 17/519,156

(22) Filed: Nov. 4, 2021

(65) Prior Publication Data

US 2023/0132789 A1 May 4, 2023

(51) Int. Cl.
*G06N 20/20* (2019.01)
*G06N 5/04* (2023.01)

(52) U.S. Cl.
CPC .................................... *G06N 20/20* (2019.01)

(58) Field of Classification Search
None
See application file for complete search history.

(56) References Cited

U.S. PATENT DOCUMENTS

| | | | |
|---|---|---|---|
| 8,918,771 | B2 | 12/2014 | Dunn |
| 8,984,022 | B1 | 3/2015 | Crawford |
| 9,678,730 | B2 | 6/2017 | Dunn |
| 10,332,008 | B2 | 6/2019 | Burger |
| 10,394,779 | B2 | 8/2019 | Spisic |
| 10,650,008 | B2 | 5/2020 | Clinton |
| 10,956,835 | B2 | 3/2021 | Shi |
| 11,017,324 | B2 | 5/2021 | Moore |
| 2019/0279097 | A1 | 9/2019 | Baines |
| 2021/0012213 | A1 | 1/2021 | Kim |

OTHER PUBLICATIONS

Niu, et al., An ensemble learning model based on differentially private decision tree, Complex & Intelligent Systems, 2023, pp. 5267-5280 (Year: 2023).*
Mell et al., "The NIST Definition of Cloud Computing", National Institute of Standards and Technology, U.S. Department of Commerce, NIST Special Publication 800-145, Sep. 2011, 7 pages.

* cited by examiner

*Primary Examiner* — Wilbert L Starks
(74) *Attorney, Agent, or Firm* — Steven M. Bouknight

(57) ABSTRACT

Embodiments of the present disclosure relate to methods, systems, and computer program products for optimized prediction of a tree ensemble. According to a method, an input request is received, which indicates a plurality of input values for a plurality of variables associated with a tree ensemble. A plurality of target transformed intervals, into which the plurality of input values fall respectively, are determined by matching the plurality of input values with a plurality of sets of transformed intervals for the plurality of variables respectively. Respective prediction results for a plurality of tree models of the tree ensemble are determined based on the plurality of target transformed intervals and respective node hierarchies of the plurality of tree models. A tree ensemble prediction result is determined for the input request based on the determined prediction results of the plurality of tree models.

17 Claims, 10 Drawing Sheets

OPTIMIZED PREDICTION OF TREE ENSEMBLE

BACKGROUND

The present disclosure generally relates to artificial intelligence (AI) techniques and, more particularly, to optimized prediction of a tree ensemble.

Decision and regression trees are widely used predictive models. A decision tree uses a tree-like graph to model decisions and to predict their possible consequences, such as chance event outcomes, resource costs, financial fraud detection, threat level detection, human health diagnosis. A tree ensemble (e.g., random forest, XGBoost, LightGBM, and the like) comprises a collection of decision trees to generate an improved prediction result. The tree ensemble usually produces more accurate solutions than a single tree model. More specifically, in machine learning and statistics, a tree ensemble is an ensemble classifier that outputs the class that is determined based on respective classes output by the individual decisions trees.

SUMMARY

According to a first aspect of the present disclosure, there is provided a computer-implemented method. According to the method, an input request is received, which indicates a plurality of input values for a plurality of variables associated with a tree ensemble. The tree ensemble comprises a plurality of tree models, and a tree model comprises a plurality of nodes each associated with a decision interval for a variable, and the plurality of nodes comprise a plurality of leaf nodes each corresponding to one of a plurality of prediction results. A plurality of target transformed intervals, into which the plurality of input values fall respectively, are determined by matching the plurality of input values with a plurality of sets of transformed intervals for the plurality of variables respectively, such that a set of transformed intervals, for a variable being split by boundary points of decision intervals, are associated with a group of nodes for the variable in the plurality of tree models. Respective prediction results for the plurality of tree models are determined based on the plurality of target transformed intervals and respective node hierarchies of the plurality of tree models. A prediction result is determined for the input request based on the determined prediction results.

According to a second aspect of the present disclosure, there is provided a computer-implemented system. The system comprises a processing unit; and a memory coupled to the processing unit and storing instructions thereon. The instructions, when executed by the processing unit, perform acts of the method according to the first aspect of the present disclosure.

According to a third aspect of the present disclosure, there is provided a computer program product being tangibly stored on a non-transient machine-readable medium and comprising machine-executable instructions. The instructions, when executed on a device, cause the device to perform acts of the method according to the first aspect of the present disclosure.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
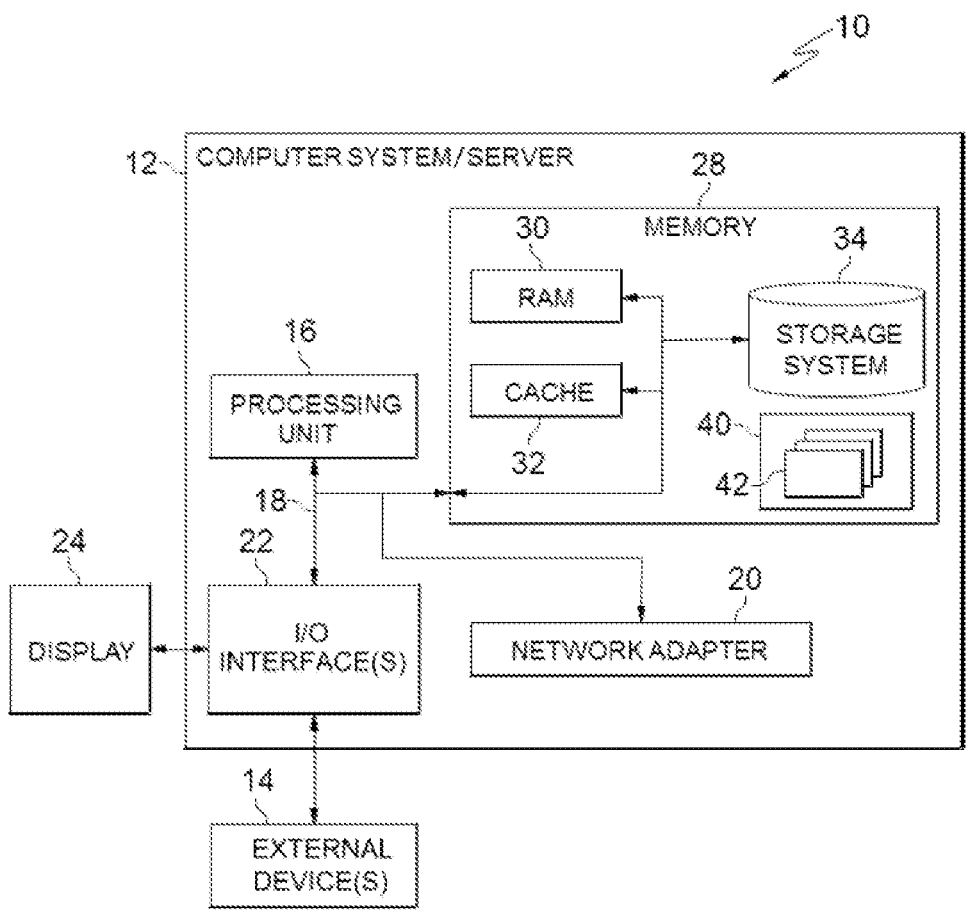
FIG. 1 depicts a cloud computing node, according to some embodiments of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
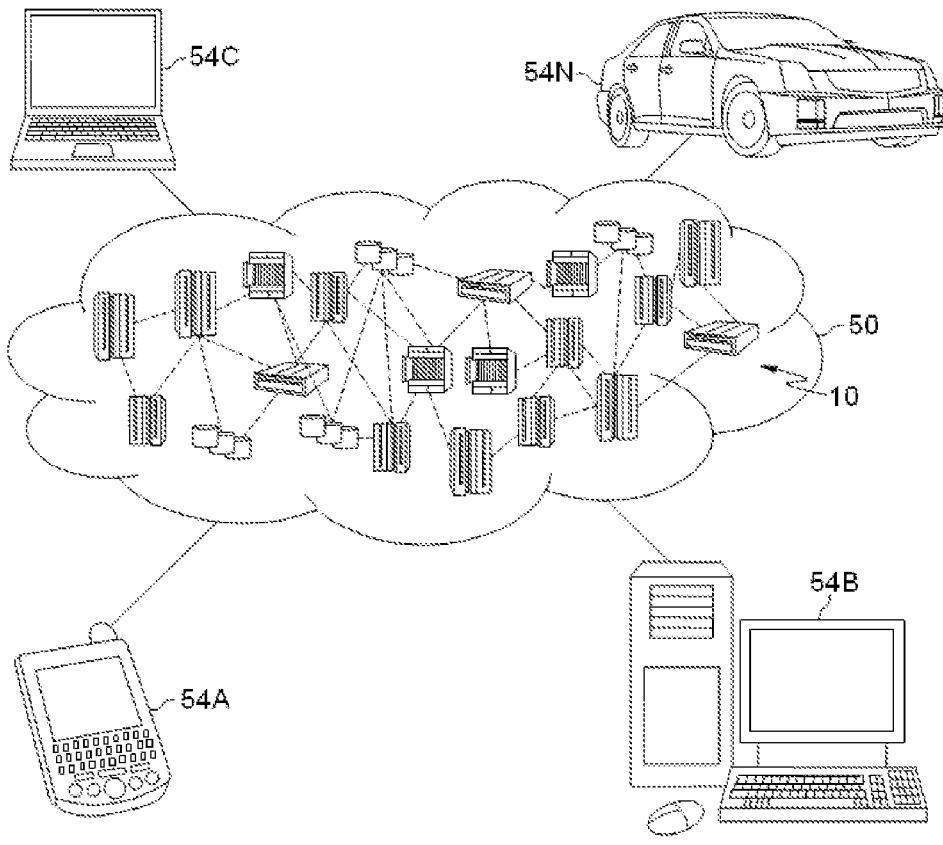
FIG. 2 depicts a cloud computing environment, according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
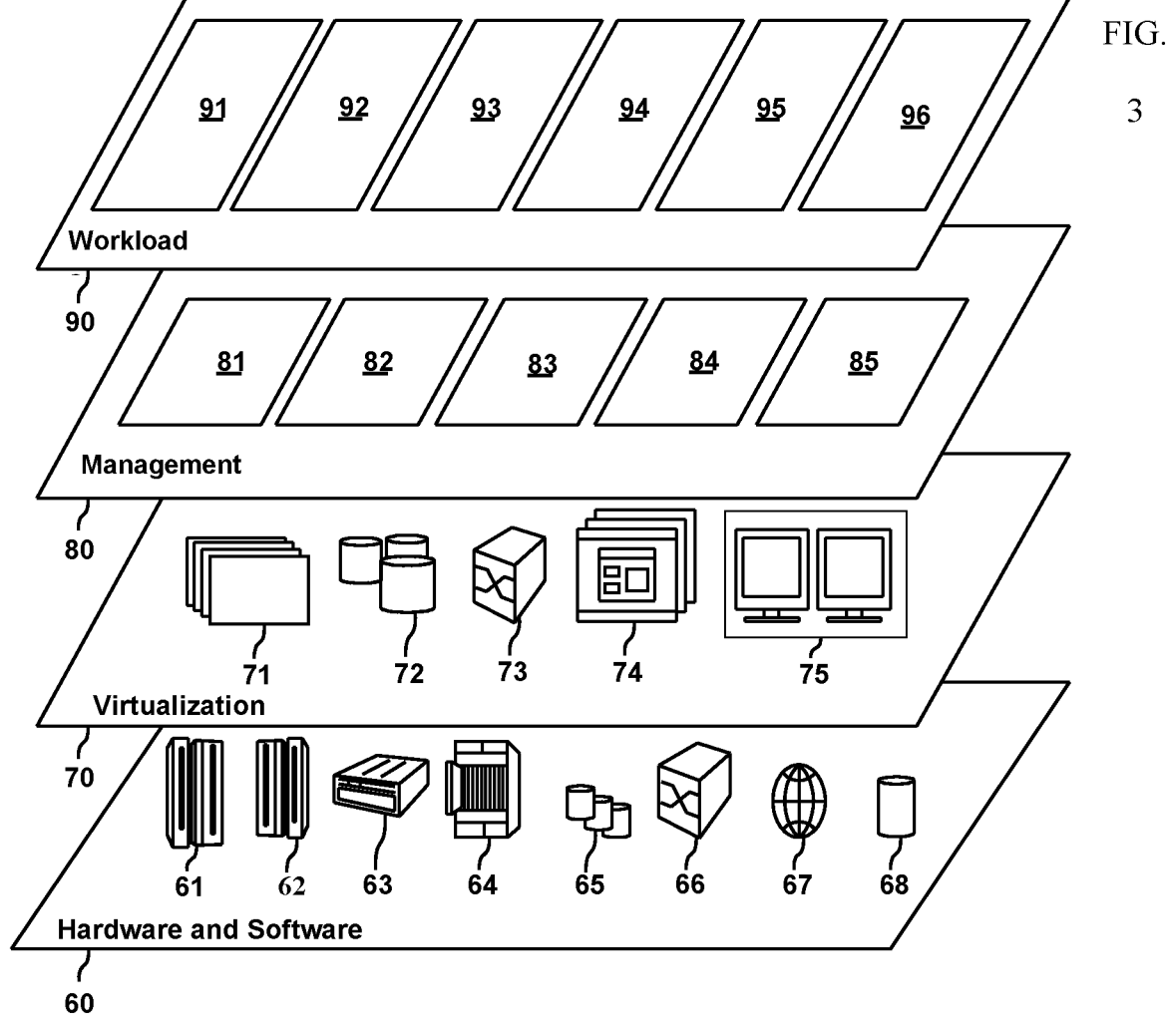
FIG. 3 depicts abstraction model layers, according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workload layer 90 provides examples of functionality for which the cloud computing environment may be utilized. Examples of workloads and functions which may be provided from this layer includes mapping and navigation 91; software development and lifecycle management 92; virtual classroom education delivery 93; data analytics processing 94; transaction processing 95; and tree ensemble optimized prediction 96. The functionalities of tree ensemble optimized prediction 96 will be described in the following embodiment of the present disclosure.

Decision trees are tree models which may be used for classifying input data into different, predefined classes. In machine learning, a decision tree may be used to implement a non-linear machine learning model that models a classification or regression problem as a series of binary decisions based on its input features and leading to a final result stored in the leaf nodes. The calculation of a prediction result from some input data will in the following be referred to as "prediction." In the following, a decision tree is referred to as a "tree model" or "tree," and those terms are used interchangeably herein.

In order to increase accuracy, it is a common approach to use combinations of multiple tree models for calculating a prediction result. The collections of multiple tree models are known as a "tree ensemble" or a "tree ensemble model". The predictions of the tree models in the tree ensemble need to be combined using an appropriate combination scheme, (e.g., an un-weighted or weighted voting function or averaging for tree models).

Figure 4:
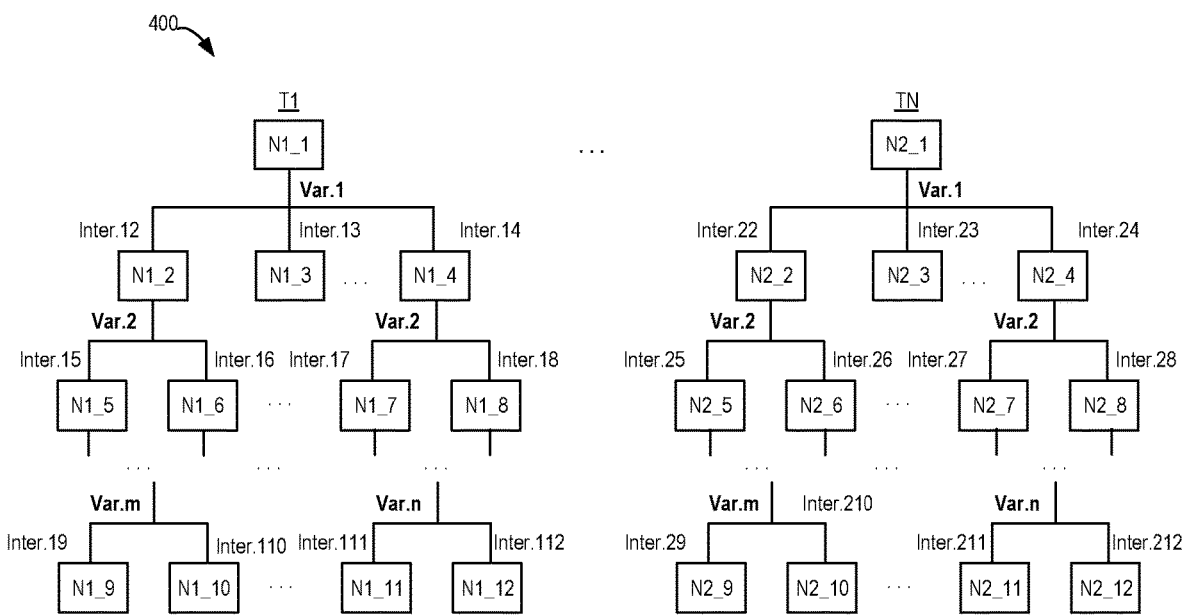
FIG. 4 depicts a schematic diagram of an example tree ensemble with a plurality of tree models.

FIG. 4 depicts an exemplary tree ensemble 400 in accordance with an illustrative embodiment. Although two tree models (T1, TN) are explicitly illustrated, a tree ensemble may comprise multiple thousand tree models. Each tree model comprises nodes in a tree-like hierarchy. The nodes in a tree model comprise a root node (N1_1 for T1, N2_1 for TN) and a plurality of nodes emanating from the root node. The tree model comprises a feature that causes a split at a plurality of nodes in the tree model based on threshold intervals (referred to as "decision interval" herein) for a plurality of variables. Such variables may sometimes be referred to as split variables.

To perform the prediction, an input request is obtained, which may comprise a plurality of input values for a plurality of variables associated with the tree ensemble. For each tree model, the decision is first made from the root node. In a tree model, a decision related to a variable is made based on a plurality of decision intervals. For example, in T1 in FIG. 4, a decision related to a variable represented as "Var.1" is made at the root node N1_1. Three child nodes represented as "N1_2," "N1_3," and "N1_4," are split from the root node, each associated with one of decision intervals represented as "Inter.12," "Inter.13," and "Inter.14." A decision interval may define a numerical or un-numerical value range. If an input value for Var.1 falls within one of the tree decision intervals, the child node is passed and a following decision for another variable is made at that child node.

The decision making process continues until reaching a leaf node, which has no child node. A leaf node is corresponding to one of a plurality of possible prediction results. The prediction result at the reached leaf node is then obtained for the input request in the tree model. The prediction in each of other tree models in the tree ensemble 400 is similar. All prediction results provided by the collection of tree models in the tree ensemble 400 may be combined to determine a final prediction result for the input request.

As a summary, in the tree ensemble, each node except the root node in a tree model is considered to be associated with a decision interval for a variable. For example, a node N1_1 in the tree model T1 is considered to be associated with a decision interval Inter.12 for the variable Var.1, a node N1_5 is considered to be associated with a decision interval Inter.15, and a node N1_9 is considered to be associated with a decision interval Inter.19. A leaf node in the tree model is corresponding to one of a plurality of prediction results for the tree model.

As a specific example, if the tree ensemble 400 is modeled to perform a prediction for whether a requesting user is a valid user, the tree ensemble 400 may be associated with a plurality of variables that are determined to be useful in predicting whether a user is a valid user or an invalid user, such as username, user age, user account, user logging time, user logging device, and so on. Two leaf nodes which are child nodes of a same parent node may be corresponding to a prediction result indicating that the user is a valid user and a prediction result indicating that the user is an invalid user, respectively.

For example, in FIG. 4, two leaf nodes N1_9 and N1_10 in the tree model T1 may be corresponding to the two prediction results, and two leaf nodes N1_11 and N1_12 may be corresponding to the two prediction results. Similarly, two leaf nodes N2_9 and N2_10 in the tree model T2 may be corresponding to the two prediction results, and two leaf nodes N2_11 and N2_12 may be corresponding to the two prediction results. The prediction results from all the tree models are combined to determine the final prediction result for the input request. For example, if most of the tree models provide a prediction result indicating that the user is an invalid user, then it is determined as the final prediction result for the input request.

It should be appreciated that the tree structure shown in FIG. 4 is merely for the purpose of illustration. In some embodiments, different tree models in a tree ensemble may have different tree structures. In some embodiments, the number of leaf nodes, the number of non-leaf nodes, and the number of child nodes for a parent node in a tree model may be varied. In some embodiments, each tree model may be associated with some, but not all, of the variables for the tree ensemble.

Traditionally, when performing the prediction for a tree ensemble comprising a number of tree models, each of the tree models is traversed to determine a prediction result. The time needed to predict a result using a tree ensemble of N tree models is N times greater than the prediction time needed when using a single tree model. The high time cost is especially problematic for use cases that are time-critical, such as credit card fraud which may require a prediction result returned in a specified time, possibly in milliseconds.

In view of the above, according to embodiments of the present disclosure, there is proposed a solution for optimized prediction of a tree ensemble. In this solution, a tree ensemble with a plurality of tree models is preprocessed. A set of transformed intervals is determined for each of a plurality of variables in the tree ensemble based on boundary points of decision intervals associated with a set of nodes for the variable in the plurality of tree models. The transformed intervals for each variable are compared with an input value for the variable to determine a target transformed interval into which the input value falls. A prediction result for each tree model can be quickly determined based on the target transformed intervals determined for the variables and a node hierarchy in the tree model. Then a prediction for the input request can be determined based on the respective prediction results for the plurality of tree models in the tree ensemble.

Through the solution, the prediction efficiency for a tree ensemble can be significantly improved because there is no need to traverse the decision intervals for each variable in each tree model of a tree ensemble.

Based on investigations, embodiments of the present disclosure have determined that tree models in a tree ensemble are often trained with similar data and may have roughly the same variables or at least share some of the same variables. According to the traditional prediction process, an input value for a first variable may be mapped into one of the decision intervals configured for the first variable and the mapping operation may be repeated a number of times throughout the collection of tree models. By analyzing the relationship between nodes across the tree ensemble and designating the transformed intervals from the decision intervals in the tree models, the repeated operations can be avoided, and the efficiency can thus be improved.

Figure 5:
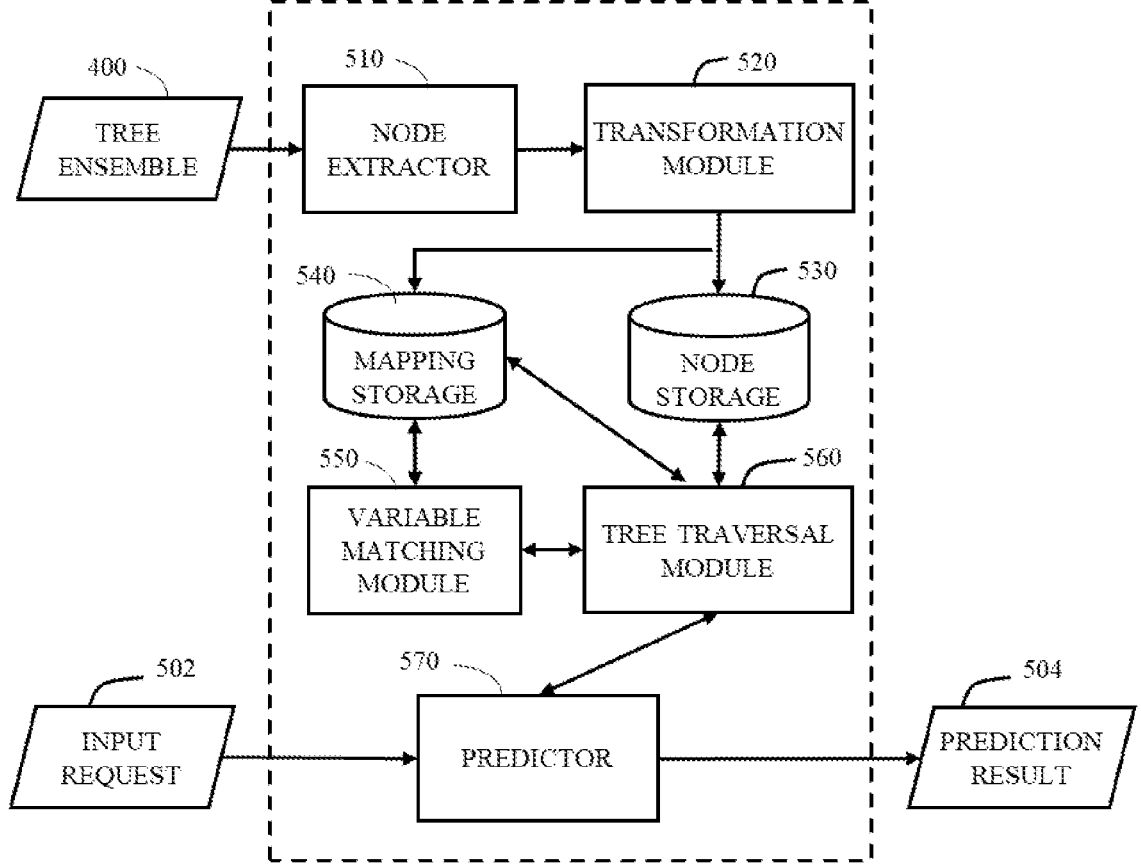
FIG. 5 depicts a block diagram of a system, according to some embodiments of the present disclosure.

Reference is made to FIG. 5, which illustrates a block diagram of a system 500 for tree ensemble preprocessing and online prediction, according to some embodiments of the present disclosure. As illustrated, the system 500 comprises a node extractor 510, a transformation module 520, node storage 530, mapping storage 540, a variable matching module 550, a tree traversal module 560, and a predictor 570 to implement various embodiments of the present disclosure.

The node extractor 510 and the transformation module 520 are configured to perform some preprocessing operations on the tree ensemble 400 in order to optimize the prediction for the tree ensemble 400. The information resulting from the preprocessing procedure may be stored into the node storage 530 and the mapping storage 540. The variable matching module 550, the tree traversal module 560, and the predictor 570 are configured to operate to process an input request 502 for the tree ensemble 400 based on the information stored in the node storage 530 and the mapping storage 540, to provide a prediction result 504 for the input request 502.

It should be appreciated that the system 500 may be implemented by one or more computing systems or devices having computing and storage capability. For example, the system 500 may be implemented by one or more computing platforms, servers, mainframes, general-purpose computing devices, and/or the like.

It should also be appreciated that the components of the system 500 shown in FIG. 5 may be implemented as one or more software engines, components, or the like, which are configured with logic for implementing the functionality attributed to the particular module. Each component may be implemented using one or more of such software engines, components or the like. The software engines, components, and the like are executed on one or more processors of one or more computing systems or devices and utilize or operate on data stored in one or more storage devices, memories, or the like, on one or more of the computing systems.

In the following embodiments, the preprocessing of a tree ensemble is first introduced and then the processing of an input request for the tree ensemble is described, which is based on the result of the preprocessing.

Preprocessing of a Tree Ensemble

The node extractor 510 and the transformation module 520 may be configured to analyze the relationship between nodes across the tree models in the tree ensemble 400. Specifically, the node extractor 510 may be configured to extract individual nodes from the plurality of tree models (e.g., T1, T2, and so on) in the tree ensemble 400. The node extractor 510 may determine a variable and a decision interval for the variable that is associated with a node in a tree model.

In some embodiments, the node extractor 510 may assign an identification to a node in the tree ensemble 400, which can uniquely identify the node across the plurality of tree models in the tree ensemble 400. As an example, an identification of "a_b" may be assigned to a node in a tree model with the identifier "a" to identify the tree model and the identifier "b" to identify the node in that specific tree model. In the tree ensemble 400 of FIG. 4, a node "N1_2" in the tree model T1 may be assigned with an identification "1_2," where "1" indicates T1, and "2" indicates the node in the tree model T1. It should be appreciated that any other identifiers may be assigned to identify a node across the tree models.

In some embodiments, the node extractor 510 may create node information for each extracted node in the tree ensemble 400. For a node, the node information may comprise the identification of the node and the variable to which the node is associated. The node information for individual nodes may be stored in the node storage 530. The node information will be further discussed in the detail below.

Figure 6:
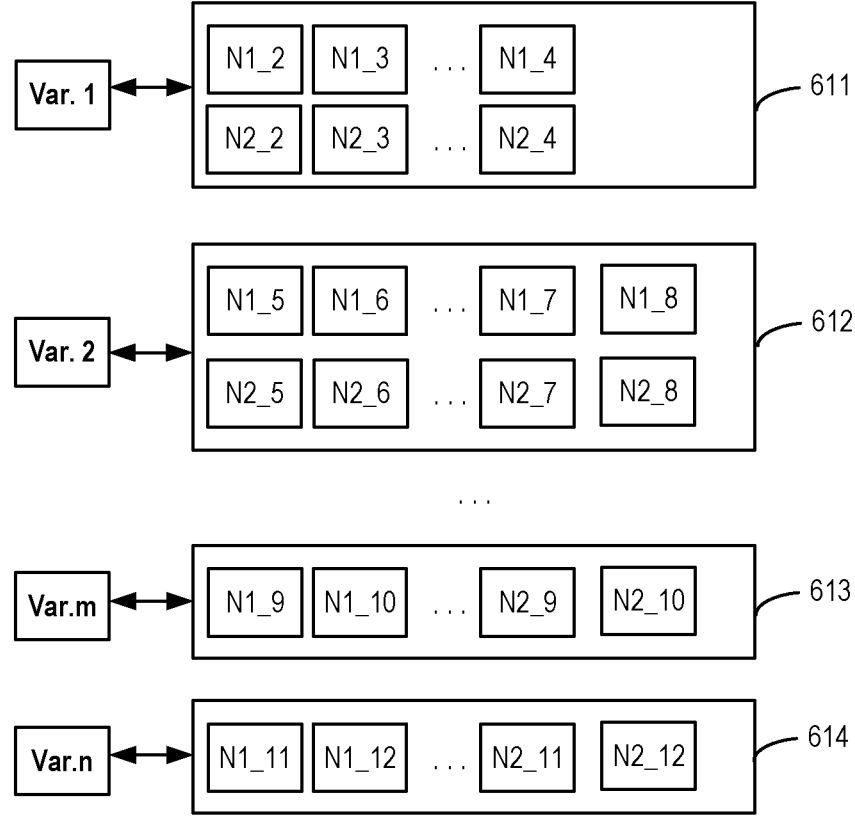
FIG. 6 illustrates an example of nodes grouped based on an association with a corresponding variable in the tree models of the tree ensemble, according to some embodiments of the present disclosure.

By extracting the nodes and the associated variables, the node extractor 510 may classify the nodes of the plurality of tree models into a plurality of groups based on the variables, each variable being mapped to a group of nodes. As illustrated in FIG. 6, a group of nodes 611 comprises nodes associated with the variable Var.1 in the tree models of the tree ensemble 400, a group of nodes 612 comprises nodes associated with the variable Var.2 in the tree models, a group of nodes 613 comprises nodes for the variable Var.m in the tree models of the tree ensemble 400, a group of nodes 614 comprises nodes associated with the variable Var.n in the tree models of the tree ensemble 400, and so on.

The transformation module 520 may be configured to determine a set of transformed intervals for a respective variable based on the decision intervals for a group of nodes associated with the same variable in the plurality of tree models in the tree ensemble 400. In many cases, if two or more tree models define decision intervals for a same variable, their decision intervals may be split in different ways. To facilitate the prediction optimization, the transformation module 520 may analyze the decision intervals associated with the nodes for a same variable, to provide a unified set of intervals for each variable (such intervals are referred to as "transformed intervals" herein).

The set of transformed intervals determined for a variable may be split by boundary points of the decision intervals associated with a group of nodes associated with the variable. Thus, a decision interval associated with a node for the variable in a tree model may be at least partially overlapped with one of the transformed intervals. In some embodiments, the transformed intervals determined for a variable may be indexed with corresponding indexing information, so as to identify the transformed intervals. In some embodiments, the transformed intervals for all the variables may be stored in the mapping storage 540.

Figure 7:
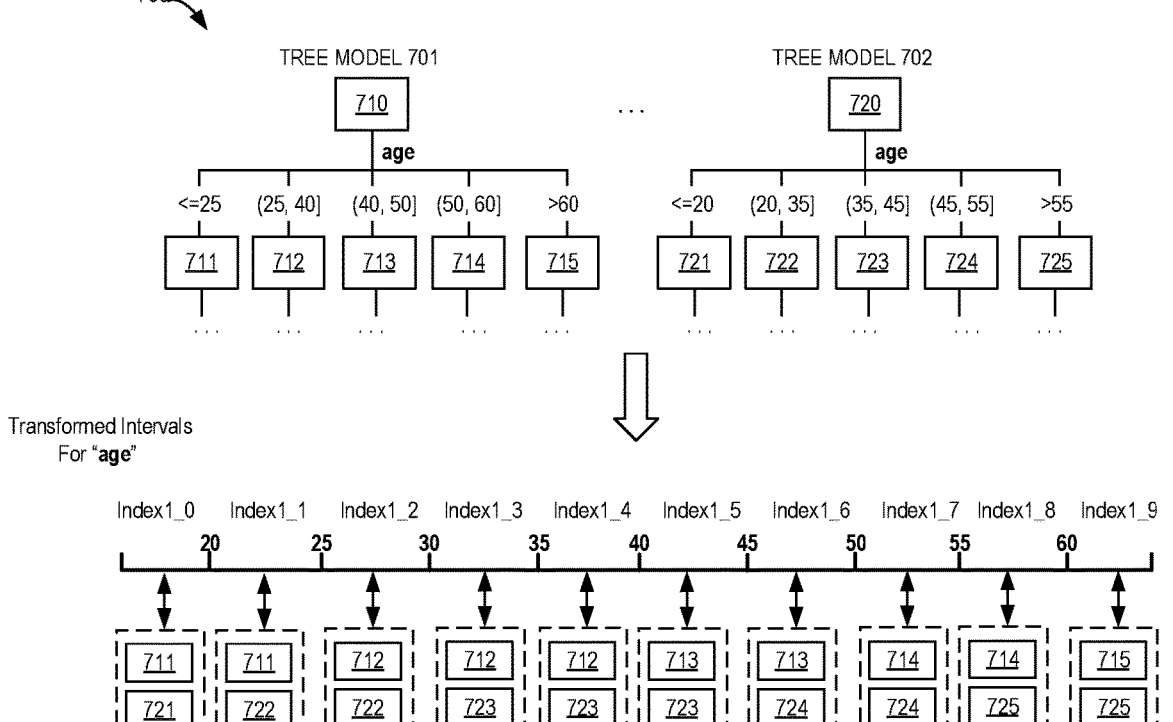
FIG. 7 illustrates an example of transformed intervals determined for a variable, according to some embodiments of the present disclosure.

FIG. 7 illustrates an example of transformed intervals determined for a variable according to some embodiments of the present disclosure. As illustrated, an example tree ensemble 700 comprises a plurality of tree models with nodes. The variable from the root node is "age," and the child nodes from the root node in at least the illustrated tree models 701 and 702 are associated with respective decision intervals for the variable "age." A set of transformed intervals are determined for the variable of "age" based on the boundary points of the decision intervals for "age," including 25, 40, 50, 60 in the tree model 701, and 20, 35, 45, and 55 in the tree model 702. The transformed intervals are defined by all those boundary points, including intervals of <=20, (20, 25], (25, 30], (30, 35], (35, 40], (40, 45], (45, 50], (50, 55], (55, 60], and >60, indexed with "Index1_0," "Index1_1," "Index1_2," "Index1_3," "Index1_4," "Index1_5," "Index1_6," "Index1_7," "Index1_8," and "Index1_9," respectively.

The number of transformed intervals determined for a variable may be determined based on the decision intervals defined in the plurality of tree models. In some cases, if the decision intervals defined for a variable for all the tree models of the tree ensemble are the same, the transformed intervals for the variable may be the same as the decision intervals.

In some embodiments, the transformation module 520 may determine a plurality of mappings between nodes in the tree ensemble 400 and the plurality sets of transformed intervals, such that each mapping determines a set of transformed intervals associated with a variable. Thus, the group of nodes for a variable may be further classified based on the transformed intervals. If a decision interval associated with a node is at least partially overlapping with a transformed interval, the node may then be mapped to the transformed interval. In some examples, a node in a tree model may be mapped to one or more transformed intervals, depending on the decision interval for the node defined in the tree model.

For example, as illustrated in FIG. 7, a set of nodes 730-1 comprising nodes 711, 721 for the variable "age" are mapped to the transformed interval of <=20 that is indexed with "Index1_0," a set of nodes 730-2 comprising nodes 711, 722 for the variable "age" are mapped to the transformed interval of (20, 25] that is indexed with "Index1_1," and so forth. The node 711 is mapped to two transformed intervals because the associated decision interval of the node 711<=25 is partially overlapped with both of the two transformed intervals.

Figure 8:
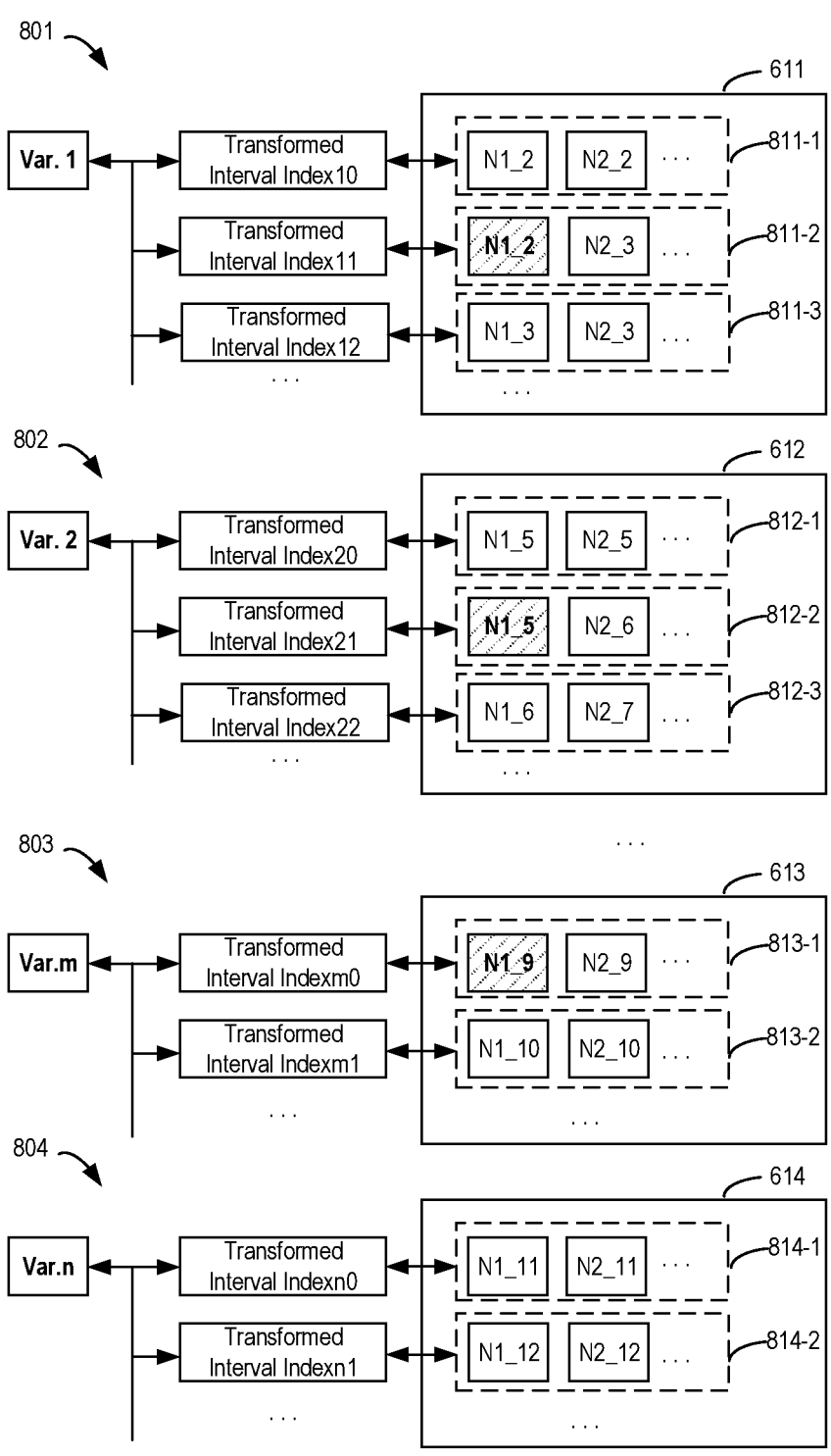
FIG. 8 illustrates an example of mappings between nodes and transformed intervals, according to some embodiments of the present disclosure.

As a more general example, FIG. 8 illustrates an example of mappings between nodes in the tree ensemble 400 and transformed intervals according to some embodiments of the present disclosure. As illustrated, a plurality of transformed intervals indexed with "Index10," "Index11," "Index12," and the like are determined for the variable "Var. 1." A mapping 801 for the variable "Var.1" indicates that a sub-group 811-1 in the group 611 comprising nodes for the variable "Var.1" are mapped to the transformed interval "Index1_0," which means that decision intervals associated with nodes N1_2 in the tree model T1 and N2_2 in the tree model T2 are at least partially overlapped with the transformed interval "Index1_0." The mapping 801 further indicates that sub-groups 811-2, 811-3 in the group 611 of nodes for the variable "Var.1" are mapped to the transformed intervals "Index1_1," "Index12," respectively.

Similarly, a mapping 802 for the variable "Var.2" indicates that sub-groups 812-1, 812-2, 812-3 in the group 612 of nodes for the variable "Var.2" are respectively mapped to transformed intervals indexed with "Index20," "Index21," "Index22," determined for the variable "Var.2." A mapping 803 for the variable "Var.m," a mapping 804 for the variable "Var.n" and so on may also be determined similarly.

In some embodiments, the mappings between nodes and transformed intervals (e.g., the mappings 801, 802, 803, 804, and so on) may be stored into the mapping storage 540 for use in the prediction stage.

In some embodiments, for a node with child nodes in a tree model, the transformation module 520 may further generate a mapping between the child nodes and respective transformed intervals to which the child nodes are mapped, which may further improve the prediction efficiency, as will be discussed below. For a specific node, its child nodes are generally associated with a different variable than its parent node and may be mapped to transformed intervals in a different set of transformed intervals determined for that different variable. In some cases, the child nodes for a specific node may not be mapped to all the transformed intervals for the variable, but only to some of them. The separate mapping between the child nodes and the mapped transformed intervals may be used for fast localization of the matched node for the variable associated with the child nodes.

In some embodiments, in addition to indicating the identification of the node and the associated variable, the node information for a node may further indicate its child nodes. The child nodes stored in the node information may indicate a part of the node hierarchy of the corresponding tree model.

Figure 9:
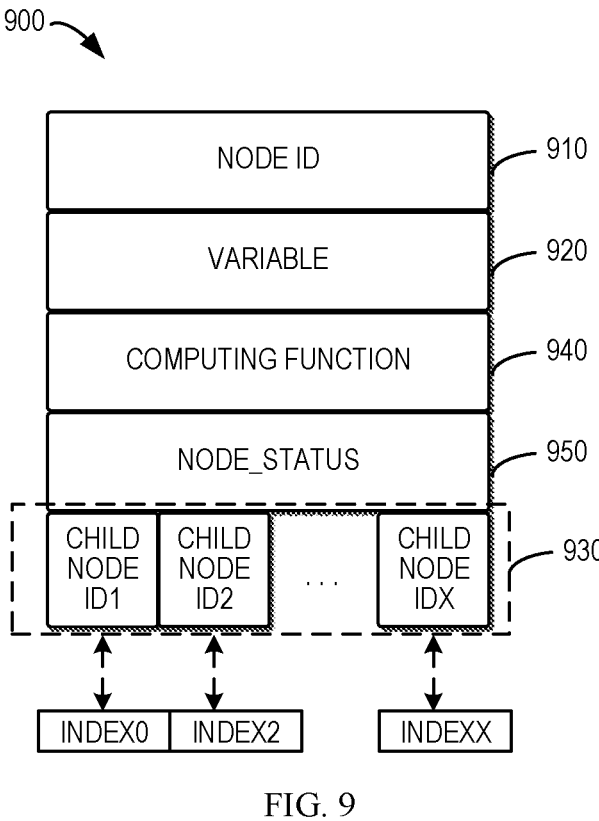
FIG. 9 illustrates an example of node information, according to some embodiments of the present disclosure.

FIG. 9 illustrates an example of node information 900 for a node according to some embodiments of the present disclosure. As illustrated, the node information 900 comprises a field of node identification (ID) 910 to indicate the identification of the node, a field of variable 920 to indicate a variable with which the node is associated, and a field of child node 930 to indicate respective identifications of child nodes of the node (represented as ID1, ID2, . . . IDX). In some embodiments, if the node is a leaf node in a tree model, the field of child node 930 may be omitted from the node information.

In some embodiments, the node information 900 may optionally comprise a field of computing function 940 to indicate an operation to be applied by the node to an input value. In some embodiments, the node information 900 may optionally comprise a field of "node status" 950 to indicate confidence information for the decision at the node. For a leaf node, the field of "node status" 950 may indicate a prediction result corresponding to the leaf node.

In some embodiments, for a node, a mapping between its child nodes and transformed intervals may be recorded. As illustrated in FIG. 9, a child node with ID1 is mapped to a transformed interval indexed with Index0, a child node with ID2 is mapped to a transformed interval indexed with Index2, and a child node with IDX is mapped to a transformed interval indexed with IndexX. The transformed intervals are determined for the variable associated with the child nodes.

Processing of an Input Request for the Tree Ensemble

Based on the preprocessing result of the tree ensemble 400 as stored in the node storage 530 and the mapping storage 540, the processing efficiency of an input request can be significantly improved. The processing of the input request will be discussed in detail here.

The predictor 570 may be configured to receive the input request 502 which indicates respective input values for the variables in the tree ensemble 400. The predictor 570 may perform the processing of the input request 502 by means of invoking functionalities of the variable matching module.

Figure 10:
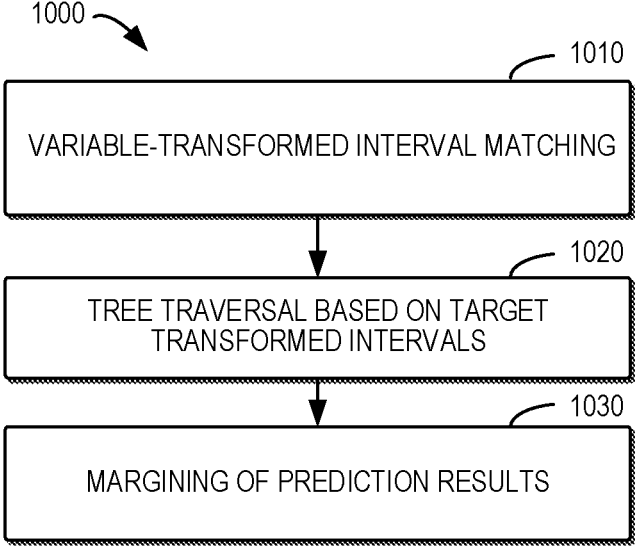
FIG. 10 illustrates a flowchart of a process for processing an input request, according to some embodiments of the present disclosure.

FIG. 10 illustrates a flowchart of a process 1000 for processing an input request according to some embodiments of the present disclosure.

At block 1010, the predictor 570 causes the variable matching module 550 to perform variable-based transformed interval matching. The variable matching module 550 may match an input value for a variable with a set of transformed intervals determined for the variable, to determine a target transformed interval into which the input value falls. In the specific example of FIG. 7, if the input request indicates an input value for "age" is 26, the variable matching module 550 may determine a target transformed interval indexed with Index1_2 for the variable "age" because the value "26" falls into the interval of (25, 30].

The variable matching module 550 may access to the mapping storage 540 to obtain the plurality of sets of transformed intervals for the plurality of variables. In some embodiments, the variable matching module 550 may apply various interval mapping techniques to efficiently find a target transformed interval into which an input value falls. As the matching of an input value with transformed intervals for a variable does not depend on the result of the matching for another variable in the node hierarchies, the variable matching module 550 may perform the input value—transformed interval matching in parallel for the plurality of variables, to further improve the efficiency.

At block 1020, the predictor 570 causes the tree traversal module 550 to perform tree traversal based on the target transformed intervals. The variable matching module 550 may provide indexes of the target transformed intervals determined for the plurality of variables to the tree traversal module 560. The tree traversal module 560 may be configured to determine respective prediction results for the plurality of tree models based on the target transformed intervals determined by the variable matching module 550 and respective node hierarchies in the plurality of tree models of the tree ensemble 400.

For a certain tree model in the tree ensemble 400, the tree traversal module 560 may perform the determination for the first variable that is associated with child nodes of the root node in the node hierarchy of the tree model. The tree traversal module 560 may determine a node mapped to a target transformed interval determined for the first variable. The tree traversal module 560 may access, from the mapping storage 550, a mapping between nodes in the tree ensemble 400 and a set of transformed intervals for the first variable. As indicated above, the mapping indicates nodes mapped to each transformed interval in the plurality of tree models of the tree ensemble 400. The tree traversal module 560 may identify, from the mapped nodes, a node included in the certain tree model that is under consideration.

As an example, in FIG. 8, an input request for the tree ensemble 400 may include specific values for the variables Var.1, Var.2, Var.m. Depending on the exact values for those variables, the variable matching module 550 determines a target transformed interval Index11 for the variable Var.1 because the value for Var.1 falls into the transformed interval Index1_1. Similarly, the variable matching module 550 may further determine a target transformed interval Index21 for the variable Var.2, determine other target transformed intervals for other variables not illustrated in FIG. 8, and determine a target transformed interval Indexm0 for the variable Var.m. To generate a prediction result for the tree model T1 (FIG. 4), the tree traversal module 560 may determine, based on the mapping 801 for the variable Var.1, that a sub-group 811-2 of nodes are mapped to the target transformed interval Index11. The tree traversal module 560 may further determine that the node N1_2 in the sub-group 811-2 is included in the tree model T1.

For the certain tree model, after determining a node (referred to as "first node" for the purpose of discussion) mapped to the target transformed interval for a variable (referred to as "first variable" for the purpose of discussion), if a node hierarchy of the certain tree model indicates that the first node has a plurality of child nodes associated with a second variable, the tree traversal module 560 may further determine a second node mapped to a target transformed interval determined for the second variable. In some embodiments, the tree traversal module 560 may access, from the node storage 530, node information for the first node (e.g., the node information 900, FIG. 9), to identify the child nodes of the first node.

In some embodiments, the tree traversal module 560 may determine the second node in a similar way as discussed above by accessing the mapping between nodes and a set of transformed intervals determined for the second variable. In some embodiments, if a specific mapping between child nodes of the first node and transformed intervals is stored in the mapping storage 540, the tree traversal module 560 may access the mapping from the mapping storage 540 and determine the second node mapped to the second target transformed interval based on the accessed mapping.

As an example, in FIG. 8, to determine a prediction result for the tree model T1, after determining that the node N1_2 is mapped to the target transformed interval for the variable Var.1, the tree traversal module 560 may access node information of the node N1_2 from the node storage 530, for example, with the identification of the node N1_2. The tree traversal module 560 may determine, from the node information of the node N1_2, a plurality of child nodes of this node which are associated with a variable Var.2. The tree traversal module 560 may further access, from the mapping storage 540, a mapping between those child nodes and transformed intervals for the variable Var.2. Since the target transformed interval for the variable Var.2 is the transformed interval indexed with Index21, from the accessed mapping, the tree traversal module 560 may determine that the child node "N1_5" of the node "N1_2" is mapped to the target transformed interval Index21 for the variable Var.2.

The tree traversal module 560 may perform similar processing for the node N1_5 associated with the variable Var. 2. In some embodiments, for a certain tree model, the tree traversal module 560 may determine a node that is mapped to a target transformed interval for a variable and has no child node in the node hierarchy of the tree model, for example, the node information of the node indicates no child node. The identified node without a child node may be a leaf node in the given tree model. In this case, the tree traversal module 560 may determine a prediction result corresponding to the leaf node for the given tree model. For example, in FIG. 8, after determining for a plurality of variables, the tree traversal module 560 may determine a node N1_9 that is mapped to the target transformed interval Indexm0. Since the node N1_9 is a leaf node in the tree model T1, the tree traversal module 560 may determine a prediction result corresponding to this leaf node as a prediction result that is output by the tree model T1 for the input request 502.

The determination of the prediction result for a tree model has been described above. The tree traversal module 560 may perform similar processing to determine the prediction results for the plurality of tree models included in the tree ensemble 400.

It can be seen that for each variable, performance of the matching of an input value occurs once for all the tree models, avoiding repeated calculation across the tree models. The prediction result for each tree model may be directly determined based on the target transformed intervals determined at block 1010.

Referring back to FIG. 10, at block 1030, the predictor 570 determines a prediction result 504 for the input request 502 by merging multiple prediction results determined from multiple tree models of the tree ensemble by the tree traversal module 560. The tree traversal module 560 may provide the prediction result for each tree model to the predictor 570. The prediction results for the tree models in the tree ensemble 400 may be combined using an appropriate combination scheme, for example, an un-weighted or weighted voting function or averaging for tree models. The specific combing algorithm of the prediction results for the tree models may be configured by the tree ensemble 400, which is not limited by examples presented herein.

Embodiments of the present disclosure remove the requirement for traversal of the decision intervals for each variable in each tree model of a tree ensemble. The prediction efficiency for a tree ensemble can be significantly improved.

Figure 11:
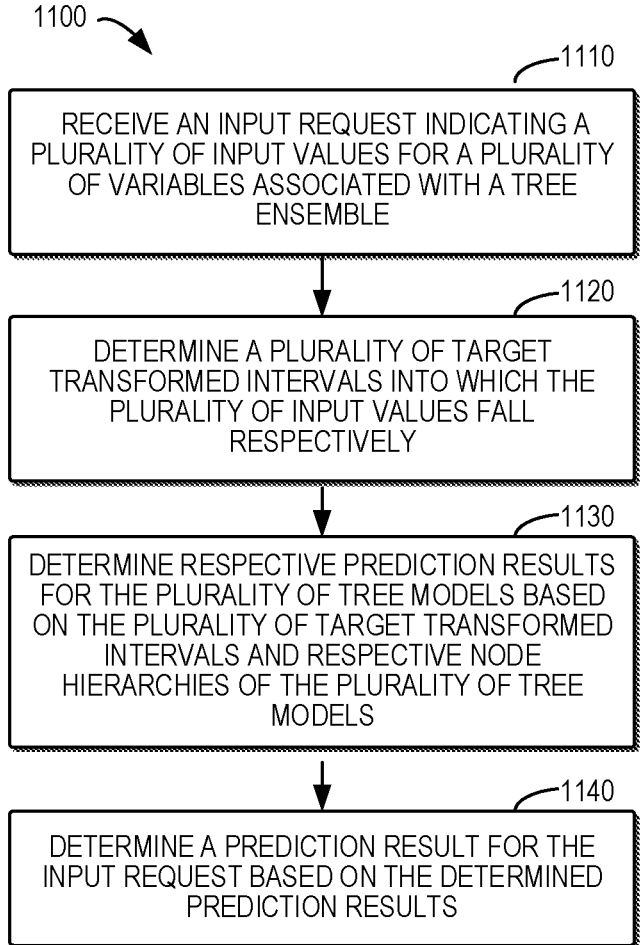
FIG. 11 depicts a flowchart of an example method, according to some embodiments of the present disclosure.

FIG. 11 shows a flowchart of an example method 1100 according to some embodiments of the present disclosure. The method 1100 can be implemented on system 500 as shown in FIG. 5. For the purpose of discussion, the method 1100 will be described from the perspective of the system 500.

At block 1110, the system 500 receives an input request indicating a plurality of input values for a plurality of variables associated with a tree ensemble. The tree ensemble comprises a plurality of tree models. A tree model comprises a plurality of nodes, each associated with a decision interval for a variable and the plurality of nodes comprises a plurality of leaf nodes each corresponding to one of a plurality of prediction results.

At block 1120, the system 500 determines a plurality of target transformed intervals into which the plurality of input values fall by respectively matching the plurality of input values with a transformed interval of the plurality of sets of transformed intervals for each of the plurality of variables. A set of transformed intervals for a variable are split by boundary points of decision intervals associated with a group of nodes for the variable in the plurality of tree models.

At block 1130, the system 500 determines respective prediction results for the plurality of tree models based on the plurality of target transformed intervals and respective node hierarchies of the plurality of tree models. At block 1140, the system 500 determines an overall tree ensemble prediction result for the input request based on the determined multiple tree model prediction results.

In some embodiments, determining the respective prediction results for the plurality of tree models comprises: for a given tree model of the plurality of tree models, determining, from the given tree model, a first node mapped to a first target transformed interval determined for a first variable; determining a decision interval associated with the first node at least partially overlapping with the first target transformed interval; in response to a node hierarchy of the given tree model indicating that the first node has a plurality of child nodes associated with a second variable; determining, from the plurality of child nodes, at least one second node mapped to at least one second target transformed interval at least determined for the second variable; determining a decision interval associated with a second node at least partially overlapping with a second target transformed interval; and in response to the node hierarchy indicating that the first node or one of the at least one second node is a leaf node in the given tree model, determining a prediction result corresponding to the leaf node for the given tree model.

In some embodiments, the method 1100 further comprises determining a plurality of mappings between nodes in the plurality of tree models and the plurality sets of transformed intervals for the plurality of variables; determining a decision interval associated with a node for a variable at least partially overlapping with a transformed interval in a set of transformed intervals for the variable; and storing the plurality of mappings.

In some embodiments, determining the first node comprises: accessing, from the plurality of mappings, a first mapping between nodes in the plurality of tree models and a first set of transformed intervals for the first variable; and determining the first node mapped to the first target transformed interval based on the first mapping. In some embodiments, the first variable is associated with child nodes of a root node in the given tree model.

In some embodiments, determining the second node comprises: accessing node information for the first node, the node information comprising respective identifications of the plurality of child nodes of the first node; accessing a second mapping between the plurality of child nodes and transformed intervals in a second set of transformed intervals for the second variable; determining a decision interval associated with a child node at least partially overlapping with a transformed interval in the second set of transformed intervals; and determining a second node mapped to the second target transformed interval based on the second mapping.

In some embodiments, the node information further comprises an identification of the first node to uniquely identify the first node in the tree ensemble. In some embodiments, accessing the node information comprises accessing the node information by an identification of the first node.

In some embodiments, the method 1100 further comprises determining the plurality of sets of transformed intervals by extracting nodes from the plurality of tree models; classifying the extracted nodes into a plurality of groups based on the plurality of variables; and determining the plurality sets of transformed intervals for the plurality of variables based on boundary points of decision intervals associated with nodes in the plurality of groups.

In some embodiments, the method 1100 further comprises determining a plurality of mappings between nodes and the plurality sets of transformed intervals; determining a decision interval associated with a node at least partially overlapping with a transformed interval in a set of transformed intervals; and storing the plurality of mappings.

It should be noted that the processing of optimized prediction of a tree ensemble according to the embodiments of this disclosure could be implemented by computer system/server 12 of FIG. 1. In some embodiments, the system 500 and/or one or more of the components of the system 500 could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, by one or more processors, a plurality of sets of transformed intervals for a tree ensemble associated with a machine learning model, wherein the machine learning model and the tree ensemble comprises a plurality of tree models having a plurality of nodes with each node associated with a decision interval corresponding to a variable, the plurality of nodes further comprising a plurality of leaf nodes with each leaf node corresponding to one of a plurality of prediction results, and wherein determining the plurality of sets of transformed intervals further comprises,
   extracting nodes from the plurality of tree models associated with the tree ensemble,
   classifying the extracted nodes into a plurality of groups of nodes based on a plurality of variables associated with the tree ensemble, and
   determining the plurality of sets of transformed intervals for the plurality of variables based on boundary points of decision intervals associated with the extracted nodes in the plurality of the group of nodes;
   in response to receiving, by the one or more processors, an input request indicating a plurality of input values for the plurality of variables associated with the tree ensemble;
   determining, by the one or more processors, a plurality of target transformed intervals into which the plurality of input values fall respectively by matching the plurality of input values with the plurality of sets of transformed intervals for the plurality of variables respectively, and a set of transformed intervals for the variable being split by the boundary points of the decision intervals associated with a group of nodes for the variable in the plurality of tree models;

determining, by the one or more processors, respective prediction results for the plurality of tree models based on the plurality of target transformed intervals and respective node hierarchies of the plurality of tree models without traversing the decision intervals for each variable in each tree model of the tree ensemble in the machine learning model; and determining, by the one or more processors, an overall prediction result by the tree ensemble for the input request based on the determined prediction results of the plurality of tree models of the tree ensemble.

2. The method of claim 1, wherein determining the respective prediction results for a given tree model of the plurality of tree models comprises:

determining, by the one or more processors and from the given tree model, a first node mapped to a first target transformed interval for a first variable, and a decision interval associated with the first node at least partially overlapping with the first target transformed interval;

in response to a node hierarchy of the given tree model indicating that the first node has a plurality of child nodes associated with a second variable, determining, by the one or more processors and from the plurality of child nodes, a second node mapped to a second target transformed interval determined for the second variable, and a decision interval associated with the second node at least partially overlapping with the second target transformed interval; and in response to the node hierarchy indicating that the first node or the second node is a leaf node in the given tree model, determining, by the one or more processors, a prediction result corresponding to the leaf node for the given tree model.

3. The method of claim 2, further comprising:

determining, by the one or more processors, a plurality of mappings between nodes in the plurality of tree models and the plurality sets of transformed intervals for the plurality of variables, a decision interval associated with a node for a variable at least partially overlapping with a transformed interval in a set of transformed intervals for the variable, and storing, by the one or more processors, the plurality of mappings, wherein determining the first node comprises:

accessing, by the one or more processors and from the plurality of mappings, a first mapping between nodes in the plurality of tree models and a first set of transformed intervals for the first variable; and determining, by the one or more processors, the first node mapped to the first target transformed interval based on the first mapping.

4. The method of claim 2, wherein the first variable is associated with child nodes of a root node in the given tree model.

5. The method of claim 2, wherein determining the second node comprises:

accessing, by the one or more processors, node information for the first node, the node information comprising respective identifications of the plurality of child nodes;

accessing, by the one or more processors, a second mapping between the plurality of child nodes and transformed intervals in a second set of transformed intervals for the second variable;

accessing, by the one or more processors, a decision interval associated with a child node at least partially overlapping with a transformed interval in the second set of transformed intervals; and determining, by the one or more processors, the second node mapped to a second target transformed interval for the second variable, based on the second mapping.

6. The method of claim 2, wherein determining the first node mapped to the first target transformed interval for a first variable further comprises:

accessing, by the one or more processors, node information including a unique identification of the first node within the tree ensemble; and accessing, by the one or more processors, the node information of the first node based on the unique identification of the first node included in the accessed node information.

7. A computer-implemented system comprising:

one or more processing units; and a memory coupled to the one or more processing units and storing instructions thereon, the instructions, when executed by the one or more processing units, performing acts comprising:

determining, by one or more processors, a plurality of sets of transformed intervals for a tree ensemble associated with a machine learning model, wherein the machine learning model and the tree ensemble comprises a plurality of tree models having a plurality of nodes with each node associated with a decision interval corresponding to a variable, the plurality of nodes further comprising a plurality of leaf nodes with each leaf node corresponding to one of a plurality of prediction results, and wherein determining the plurality of sets of transformed intervals further comprises, extracting nodes from the plurality of tree models associated with the tree ensemble, classifying the extracted nodes into a plurality of groups of nodes based on a plurality of variables associated with the tree ensemble, and determining the plurality of sets of transformed intervals for the plurality of variables based on boundary points of decision intervals associated with the extracted nodes in the plurality of the group of nodes;

in response to receiving, by the one or more processors, an input request indicating a plurality of input values for the plurality of variables associated with the tree ensemble;

determining, by the one or more processors, a plurality of target transformed intervals into which the plurality of input values fall respectively by matching the plurality of input values with the plurality of sets of transformed intervals for the plurality of variables respectively, and a set of transformed intervals for the variable being split by the boundary points of the decision intervals associated with a group of nodes for the variable in the plurality of tree models;

determining, by the one or more processors, respective prediction results for the plurality of tree models based on the plurality of target transformed intervals and respective node hierarchies of the plurality of tree models without traversing the decision intervals for each variable in each tree model of the tree ensemble in the machine learning model; and determining, by the one or more processors, an overall prediction result by the tree ensemble for the input request based on the determined prediction results of the plurality of tree models of the tree ensemble.

8. The system of claim 7, wherein determining the respective prediction results for the plurality of tree models comprises:

for a given tree model of the plurality of tree models, determining, from the given tree model, a first node mapped to a first target transformed interval for a first variable, and a decision interval associated with the first node at least partially overlapping with the first target transformed interval;

in response to a node hierarchy of the given tree model indicating that the first node has a plurality of child nodes associated with a second variable, determining, from the plurality of child nodes, a second node mapped to a second target transformed interval determined for the second variable, and a decision interval associated with the second node at least partially overlapping with the second target transformed interval; and in response to the node hierarchy indicating that the first node or the second node is a leaf node in the given tree model, determining a prediction result corresponding to the leaf node for the given tree model.

9. The system of claim 8, wherein the acts further comprise:

determining a plurality of mappings between nodes in the plurality of tree models and the plurality sets of transformed intervals for the plurality of variables;

determining a decision interval associated with a node for a variable at least partially overlapping with a transformed interval in a set of transformed intervals for the variable;

storing the plurality of mappings, wherein determining the first node comprises:

accessing, from the plurality of mappings, a first mapping between nodes in the plurality of tree models and a first set of transformed intervals for the first variable; and determining the first node mapped to the first target transformed interval based on the first mapping.

10. The system of claim 9, wherein the first variable is associated with child nodes of a root node in the given tree model.

11. The system of claim 8, wherein determining the at least one second node comprises:

accessing node information for the first node, the node information comprising respective identifications of the plurality of child nodes;

accessing a second mapping between the plurality of child nodes and transformed intervals in a second set of transformed intervals for the second variable, a decision interval associated with a child node at least partially overlapping with a transformed interval in the second set of transformed intervals; and determining the second node mapped to the second target transformed interval based on the second mapping.

12. The system of claim 8, wherein determining the first node mapped to the first target transformed interval for a first variable further comprises:

accessing node information including a unique identification of the first node within the tree ensemble; and accessing the node information of the first node based on the unique identification of the first node included in the accessed node information.

13. A computer program product, the computer program product comprising a computer readable storage medium having program instructions embodied therewith, the program instructions executable by an electronic device to cause the electronic device to perform acts comprising:

determining, by one or more processors, a plurality of sets of transformed intervals for a tree ensemble associated with a machine learning model, wherein the machine learning model and the tree ensemble comprises a plurality of tree models having a plurality of nodes with each node associated with a decision interval corresponding to a variable, the plurality of nodes further comprising a plurality of leaf nodes with each leaf node corresponding to one of a plurality of prediction results, and wherein determining the plurality of sets of transformed intervals further comprises, extracting nodes from the plurality of tree models associated with the tree ensemble, classifying the extracted nodes into a plurality of groups of nodes based on a plurality of variables associated with the tree ensemble, and determining the plurality of sets of transformed intervals for the plurality of variables based on boundary points of decision intervals associated with the extracted nodes in the plurality of the group of nodes;

in response to receiving, by the one or more processors, an input request indicating a plurality of input values for the plurality of variables associated with the tree ensemble;

determining, by the one or more processors, a plurality of target transformed intervals into which the plurality of input values fall respectively by matching the plurality of input values with the plurality of sets of transformed intervals for the plurality of variables respectively, and a set of transformed intervals for the variable being split by the boundary points of the decision intervals associated with a group of nodes for the variable in the plurality of tree models;

determining, by the one or more processors, respective prediction results for the plurality of tree models based on the plurality of target transformed intervals and respective node hierarchies of the plurality of tree models without traversing the decision intervals for each variable in each tree model of the tree ensemble in the machine learning model; and determining, by the one or more processors, an overall prediction result by the tree ensemble for the input request based on the determined prediction results of the plurality of tree models of the tree ensemble.

14. The computer program product of claim 13, wherein determining the respective prediction results for a given tree model of the plurality of tree models comprises:

determining from the given tree model, a first node mapped to a first target transformed interval for a first variable, and a decision interval associated with the first node at least partially overlapping with the first target transformed interval;

in response to a node hierarchy of the given tree model indicating that the first node has a plurality of child nodes associated with a second variable, determining and from the plurality of child nodes, a second node mapped to a second target transformed interval determined for the second variable, and a decision interval associated with the second node at least partially overlapping with the second target transformed interval; and in response to the node hierarchy indicating that the first node or the second node is a leaf node in the given tree model, determining a prediction result corresponding to the leaf node for the given tree model.

15. The computer program product of claim 14, wherein the acts further comprise:

determining a plurality of mappings between nodes in the plurality of tree models and the plurality sets of transformed intervals for the plurality of variables, a decision interval associated with a node for a variable at least partially overlapping with a transformed interval in a set of transformed intervals for the variable, and storing the plurality of mappings, wherein determining the first node comprises:

accessing, from the plurality of mappings, a first mapping between nodes in the plurality of tree models and a first set of transformed intervals for the first variable; and determining the first node mapped to the first target transformed interval based on the first mapping.

16. The computer program product of claim 14, wherein the first variable is associated with child nodes of a root node in the given tree model.

17. The computer program product of claim 14, wherein determining the at least one second node comprises:

accessing node information for the first node, the node information comprising respective identifications of the plurality of child nodes;

accessing a second mapping between the plurality of child nodes and transformed intervals in a second set of transformed intervals for the second variable;

accessing a decision interval associated with a child node at least partially overlapping with a transformed interval in the second set of transformed intervals; and determining the second node mapped to the second target transformed interval for a second variable, based on the second mapping.

\* \* \* \* \*